United States Patent [19]

Winnacker

[11] 4,035,816
[45] July 12, 1977

[54] HOUSING ASSEMBLY FOR AN UNDERWATER CAMERA WITH A FLASH DEVICE

[75] Inventor: Helmut Winnacker, Burgdorf, Germany

[73] Assignee: Preussag Aktiengesellschaft, Germany

[21] Appl. No.: 704,406

[22] Filed: July 12, 1976

[30] Foreign Application Priority Data

July 17, 1975 Germany .......................... 2531938

[51] Int. Cl.² ......................................... G03B 17/08
[52] U.S. Cl. .................................. 354/64; 354/126
[58] Field of Search ...................... 354/63, 64, 126; 350/319

[56] References Cited

U.S. PATENT DOCUMENTS 3,349,680 10/1967 Hellenkamp ........................ 354/64

*Primary Examiner*—John Gonzales
*Attorney, Agent, or Firm*—Allegretti, Newitt, Witcoff & McAndrews

[57] ABSTRACT

An improved housing assembly for an underwater camera with a flash device is disclosed and includes a hollow cylindrical pressure housing. The hollow cylindrical pressure housing has a shell or wall including a window for the objective of the camera and has a pressure tight head, made of transparent material, in which the flash device is disposed.

10 Claims, 3 Drawing Figures

HOUSING ASSEMBLY FOR AN UNDERWATER CAMERA WITH A FLASH DEVICE

BACKGROUND AND SUMMARY OF THE INVENTION

The present invention relates to an improved housing assembly for an underwater camera with a flash device, the housing assembly comprising a hollow cylindrical pressure housing which includes a shell having a window for the objective of the camera and which has a transparent pressure tight head for the flash device that includes a flash lamp.

Housing assemblies for underwater cameras having a built-in flash device are known, and in such known housing assemblies, the objective of the camera is arranged behind a first window in the shell of the cylindrical pressure housing. For the purpose of avoiding any reflections with the underwater cameras, an additional window is provided in the shell for the flash device and the flash lamp of the flash device is mounted behind this second window. For best possible utilization of the exposure angle of the objective of the camera, the second window for the flash lamp is arranged as close as possible to the first window for the objective. Since housing assemblies for underwater cameras, which are more particularly used at great depths, have to withstand considerable differences in pressure, it is necessary to take particular care in the production and sealing of the windows in the assemblies. The two windows, disposed in juxtaposition, considerably weaken the wall of the cylindrical pressure housing, and this, in turn, has to be compensated for by selecting relatively large wall thicknesses. As a result, the underwater camera housing assembly becomes relatively heavy and large. In addition, the pressure housing, in the form of a cylinder, only permits relatively small windows if the wall is not to be too greatly weakened and if it is desired to use the underwater camera at great depths. This in its turn, means that an illumination of quite a narrow angle is obtained so that a large number of exposures are necessary for photographically covering a large zone or area.

Accordingly, the object of the present invention is to provide an improved housing assembly for an underwater camera designed for being used at great depths, and in which the expense for the incorporation of a flash device with the camera is reduced and which, at the same time, permits a wide-angle illumination. This object is achieved, according to the present invention, by the utilization of a pressure housing having a pressure-tight head made of transparent material, such as for example, transparent acrylic glass, in which the flash lamp is arranged.

Resulting from the design of the improved housing assembly for an underwater camera, in accordance with the invention, it is possible to dispense with the costly installation of an additional window for the flash device. A comparable construction from the material of the pressure housing would mean a substantial lengthening of the housing and a corresponding increase in weight of the complete housing assembly for the underwater camera to obtain a comparable illumination of the subject. It is true that the flash lamp is at a greater spacing from the objective of the camera than with the known housing assemblies for underwater cameras, but the transparent head in which the flash lamp is arranged or disposed permits, in practice, illumination all round in the radial direction. Moreover in the axial direction vis-a-vis the housing assembly, in which the illumination is restricted in the direction of the pressure housing by the upper edge of the latter, a best possible adaptation to the existing exposure conditions is obtained by the fact that, allowing for the refraction of the light beams, the light source which is formed by the flash lamp is positioned at such a distance in the head that there is produced a covering of the exposure zone of the objective of the camera and of the divergent pencil of rays of the light source in the plane of the subject. Since the head, in practice, forms one closure means of the pressure housing, the dealing also does not raise any problems.

A best possible pressure tightness of the head is obtained by the fact that the head is a solid cylinder which comprises a bore open towards the interior of the hollow pressure housing and in which the flash lamp is seated. So as to keep as low as possible the technical and manufacturing costs, bearing in mind the optical possibilities, the bore of the head and the flash lamp, which is arranged in the latter, are disposed axially. Since the underwater camera normally only comprises one objective, it is possible to increase the intensity of the illumination of the subject by a reflector which is provided in the bore of the housing and which is pointed in the direction of the objective of the camera.

It is possible to produce a simple connection of the head with the pressure housing by the head having a threaded part, by which it is screwed onto the end of the pressure housing. For this purpose, the head is advantageously provided on the underside which has a central threaded connector and which is screwed into the end of the pressure housing and through which the bore passes.

According to another embodiment of the present invention, the head includes an annular flange which is drawn or extended downwardly and which is provided with an internal thread. The end of the pressure housing has an external thread, onto which the head is screwed by means of the flange. The possibility which arises in this case is that the bore, and hence the flash lamp, is provided near the wall of the pressure housing, as a result of which the illumination angle in the axial direction towards the objective is enlarged.

A reliable sealing at the abutment surfaces between head and pressure housing is obtained by an O-ring seal being arranged between the underside of the head and that annular surface of the end of the pressure housing which faces the head, the O-ring advantageously lying in an annular groove in the ring surface of the pressure housing.

SUMMARY OF THE DRAWINGS

The present invention is to be more fully explained by reference to the accompanying drawings, in which one embodiment is illustrated.

In the drawings.

DESCRIPTION OF THE PREFERRED EMBODIMENT

Figures 1, 2:
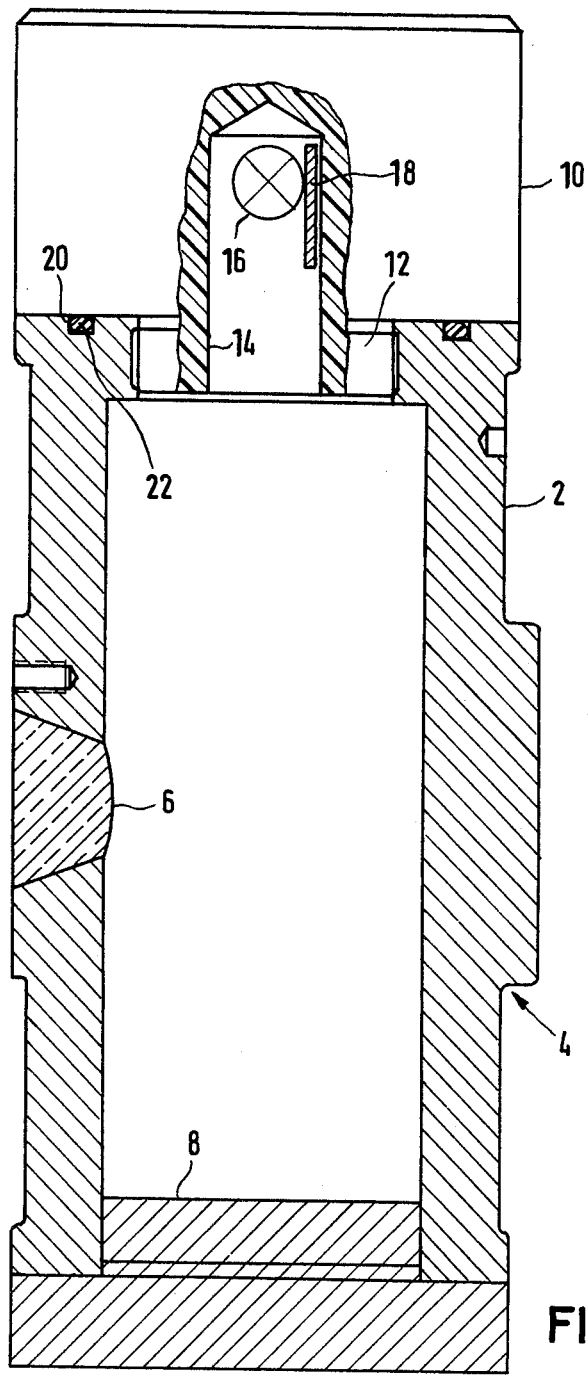
FIG. 1 is a partial section through an improved housing assembly for an underwater camera according to the present invention, having a head with a threaded connection therewith for the flash lamp.
FIG. 2 is a perspective partially exploded view of the improved housing assembly for an underwater camera according to FIG. 1, without the bottom closing part.

Indicated in FIG. 1 by the reference numeral 2 is a cylindrical shell or wall of a pressure housing assembly 4, which can, for example, consist of an aluminum casting, and which is designed for usage with an underwater camera in accordance with the present invention. Arranged in the shell 2 is a window 6, consisting, for example, of glass, behind which is arranged an objective (not shown) of a conventional photographic camera. As illustrated in FIG. 1, the wall is strengthened in the region of the window 6. The bottom end of the pressure housing 4 is closed by a housing seal 8.

Arranged at the opposite end of the pressure housing 4 is a head 10 which consists of transparent material, such as, for example, acrylic glass, and which is screwed by means of a threaded connector 12 into the upper end of the pressure housing 4. Extending into the interior of the head 10, through the threaded connector 12, is an axial bore 14. Arranged in the bore 14, is a conventional flash lamp 16 that here is only diagrammatically represented and that is seated in a holder (not shown), on which can, for example, be fixed a conventional reflector 18 which here is only indicated diagrammatically. An annular groove 20 for an O-ring 22 is provided for sealing purposes in the end face of the pressure housing 4.

For illustration purposes, the improved housing assembly for the underwater camera according to FIG. 1 is also shown in perspective in FIG. 2 as an exploded view, and as regards FIG. 1, the same reference numerals are shown herein for the same parts of the camera housing. Also shown is a base 24 and a holder 26 for the flash lamp 16, on which the reflector 18 may be molded.

Figure 3:
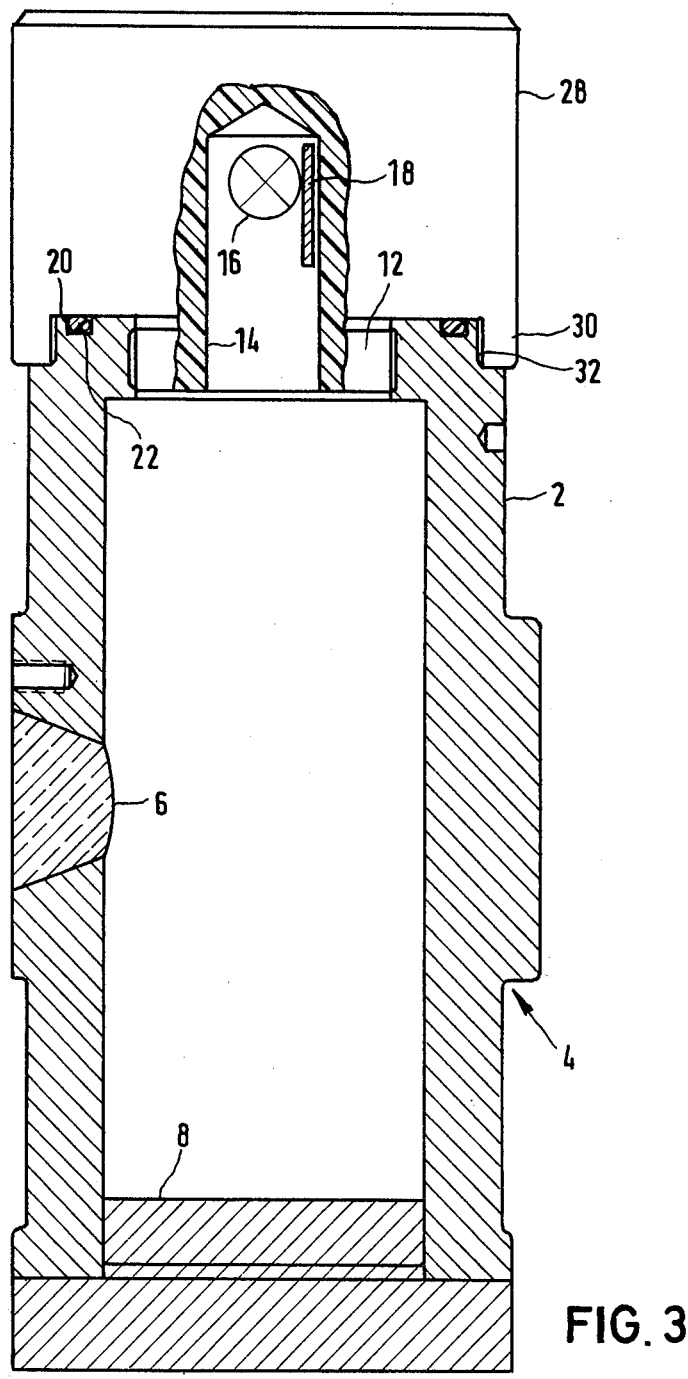
FIG. 3 shows a view, similar to that in FIG. 1, of an improved housing assembly for an underwater camera having a different constructional form of the head for the flash lamp.

FIG. 3 shows an improved housing assembly for an underwater camera, similar to that shown in FIG. 1, in which the head 28 is provided with an outer annular flange 30 which is drawn or extended downwardly. The flange 30 has an internal thread 32 by means of which the head 28, as shown, is screwed on to the end of the pressure housing 4.

I claim:

1. An improved housing assembly for an underwater camera having a flash device which includes a flash lamp, the improved housing assembly comprising: a hollow cylindrical pressure housing having a cylindrical shell; a window formed in the cylindrical shell for the objective of the underwater camera; and a pressure tight head which is made of transparent material, which is connected with and closes an end of the cylindrical shell and in which the flash lamp is disposed.

2. The improved housing assembly for an underwater camera according to claim 1, characterized in that the head is a solid cylinder which is made of acrylic, which comprises a bore, which is open towards the interior of the hollow pressure housing (4) and in which the flash lamp is seated.

3. The improved housing assembly for an underwater camera according to claim 2, characterized in that the flash lamp 16 is arranged axially in the bore.

4. The improved housing assembly for an underwater camera according to claim 3, characterized in that a reflector pointing in the direction of the objective is provided in the bore.

5. The improved housing assembly for an underwater camera according to claim 2, characterized in that the head comprises a threaded part with which the head is screwed onto the end of the cylindrical shell of the pressure housing.

6. The improved housing assembly for an underwater camera according to claim 5, characterized in that the head is provided on its underside with a central threaded connector which is screwed into the end of the pressure housing and through which extends the bore; and in that the head is made of acrylic glass.

7. The improved housing assembly for an underwater camera according to claim 1, characterized in that the head comprises an annular flange which is drawn or extended downwardly and which has an internal thread and in that the end of the cylindrical shell of the pressure housing has an external thread, on which the head is screwed by means of the flange.

8. The improved housing assembly for an underwater camera according to claim 7, characterized in that an O-ring seal is arranged between the underside of the head and that ring surface of the pressure housing (4) which is facing the head.

9. The improved housing assembly for an underwater camera according to claim 8, characterized in that the O-ring seal lies in an annular groove in the ring surface.

10. The improved housing assembly for an underwater camera according to claim 9, characterized in that the head is made of acrylic glass.

* * * * *